United States Patent Office 2,933,495
Patented Apr. 19, 1960

2,933,495
10-AMINOALKANOL-PHENOTHIAZINES

Richard V. Heinzelman, Robert E. Moffett, and Brooke D. Aspergren, Kalamazoo, Mich., assignors to The Upjohn Company, Kalamazoo, Mich., a corporation of Michigan No Drawing. Application October 9, 1956
Serial No. 614,808

5 Claims. (Cl. 260—243)

This invention relates to novel 10-aminoalkanolphenothiazine compounds and to methods for their preparation.

The novel compounds have the following general structural formula:

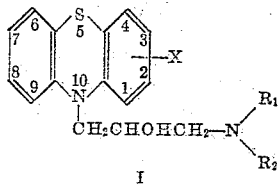

wherein X is a nuclear substituent selected from the group consisting of halogen, i.e., chlorine, bromine, fluorine and iodine, lower-alkoxy, e.g., methoxy, ethoxy, butoxy and the like, and trihalomethyl, e.g., trifluoromethyl and trichloromethyl; $R_1$ and $R_2$ when taken singly each represent an alkyl radical, preferably a lower-alkyl radical, i.e., from one to eight carbon atoms, inclusive, such as methyl, ethyl, propyl, butyl, octyl, and the like, and wherein $R_1$ and $R_2$ when taken collectively form an alkylene radical or an oxa-alkylene radical joined to the nitrogen thus constituting with the nitrogen atom a cyclic aliphatic amino group such as pyrrolidyl, piperidyl, morpholinyl, or the like. Either or both of $R_1$ and $R_2$ can contain branched substituents such as methyl groups, as are found in the polymethyl-substituted-pyrrolidyl compounds hereinafter described. The compounds can exist in the free base form or in the form of coordination compounds such as the sulfoxide, the N,5-dioxide, acid addition compound or quaternary ammonium compound, as will be disclosed in detail hereinafter.

The novel compounds of this invention possess valuable therapeutic properties, e.g., they are drug potentiators and tranquillizing agents. They are conveniently administered orally in the form of free bases, quaternary ammonium salts or acid addition salts, the latter being preferred. They have the unique additional property of possessing definite analgesic activity.

The novel compounds of this invention are conveniently prepared by, as the first step, the interaction of the nuclear substituted phenothiazine (II) with an epihalohydrin (III).

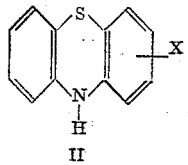

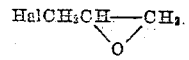

The product of the reaction is then reacted with a secondary amine of the formula:

IV

to produce the compound of Formula I. In the foregoing formulae, X, $R_1$ and $R_2$ have the values given above, and Hal is a halogen such as chlorine or bromine. The step of reacting the compound of Formula II with that of Formula III is a condensation reaction, and can be carried out in the presence of an organic lithium condensing agent such as phenyl lithium, butyl lithium, or the like. It is conveniently carried out at a temperature below room temperature such as zero to five degrees centigrade, but can be effected successfully at a temperature between the range of minus ten degrees centigrade to plus fifty degrees centigrade. It is conveniently carried out in an inert organic solvent such as diethyl ether, ethanol, acetone, toluene and the like, and is preferably carried out in a nonoxidizing atmosphere, as by heating in an atmosphere of nitrogen or other inert gas. The condensation product is often an oil difficult to crystallize, and for this reason use of a volatile solvent for the reaction is preferred.

In place of the lithium compounds previously mentioner, other alkaline condensing agents such as the alkali-metal amides, hydrides, or alkoxides can be used, for example, sodium amide, lithium amide, potassium methoxide, sodium ethoxide, sodium hydride, and the like.

The condensation reaction product and the secondary amine of Formula IV are then reacted according to known methods, for example, as disclosed in U.S. Patent 2,595,215. In general, the reaction is carried out by heating, and is preferably carried out in an inert organic medium such as methanol, benzene, toluene, or the like. A molar excess of amine is conveniently employed, and at the end of the reaction the excess amine can be removed by evaporation, using reduced pressure if desired. The product, i.e., the compound of Formula I can be purified by known methods, for example, by dissolving in mineral acid, neutralizing with a base and extracting the precipitated product with a volatile organic solvent, followed by evaporation of the solvent.

The products of this invention, represented by Formula I, are conveniently recovered from the reaction mixtures in the form of the free bases. The free bases can be converted to acid addition salts of pharmacologically acceptable acids, e.g., hydrochloride, hydrobromide, hydriodide, sulfate, citrate, acetate, succinate, benzoate, salicylate, lactate, nitrate, phosphate, glycolate, tartrate, ascorbate, and the like. They can likewise be converted by known methods to their quaternary ammonium compounds, e.g., methobromide, methiodide, ethobromide, ethochloride, benzyl chloride, ethyl para-toluenesulfonate, and the like.

The novel 10-aminoalkanolphenothiazine compounds, in the forme of their acid addition salts or quaternary ammonium salts can be transformed into their sulfoxides by oxidation with an approximately equimolar amount of a peroxidizing agent such as hydrogen peroxide, peracetic acid, or perbenzoic acid. The reaction is advantageously carried out in an inert reaction medium, preferably a solvent such as aqueous ethanol, aqueous methanol, aqueous isopropanol, or other aqueous or absolute lower alkanol, water, mixtures of lower alkanols, aqueous acetone or acetone. The reaction temperature can range from zero to 100 degrees centigrade, room temperature ordinarily being satisfactory and convenient. The reaction product is conveniently recovered from the reaction mixture by separation from the reaction medium in known manner, the product being the sulfoxide acid addition salt or quaternary ammonium salt corresponding otherwise to the starting compound. The sulfoxide acid addition salt can be converted to the sulfoxide free base by reaction with an alkali in known manner. The sulfoxide free base can be converted to the quaternary ammonium salts or acid addition salts in known manner.

The particular acid addition salts and quaternary ammonium salts described previously with regard to the unoxidized compounds of Formula I are thus readily prepared.

The novel 10-aminoalkanolphenothiazine compounds can also be transformed into their amine oxide sulfoxides, i.e., their N,5-dioxides, by reacting the free base with approximately two to three molar proportions of a peroxidizing agent under the reaction conditions described in the foregoing paragraph with regard to the preparation of the sulfoxides. The reaction product is recovered as the N,5-dioxide free base. The N,5-dioxides can be converted into their acid addition salts, i.e., those previously mentioned with regard to the compounds of Formula I and the sulfoxides, by reaction with the appropriate acid.

The N,5-dioxide free base can be prepared alternatively by further oxidation of the sulfoxide free base under the peroxidizing reaction conditions previously described, using approximately equimolar amounts of the peroxidizing agent.

The sulfoxides of the compounds of Formula I, their acid addition salts and quaternary ammonium salts; and the N,5-dioxides of the compounds of Formula I and their acid addition salts are of value in providing enhanced therapeutic ratio to the compounds of Formula I.

The term "N-5-dioxide" as used herein refers to the nuclear sulfur atom at the 5-position and the nitrogen atom occurring in the side-chain that is attached to the phenothiazine nucleus as position 10.

In the foregoing description, the following examples, and in the claims, the Chemical Abstracts system of numbering the phenothiazine nucleus is used; see Formula I, above.

The following examples are illustrative of the process and products of the present invention, but are not to be construed as limiting.

EXAMPLE 1

*Condensation of 2-chlorophenothiazine and epichlorohydrin*

In a three-liter, three-necked flask, equipped with stirrer, reflux condenser, addition funnel, thermometer, and gas inlet tube, ten grams (1.45 moles) of lithium wire was placed in one liter of dry ether. With stirring and nitrogen flowing through the system, 115 grams (0.73 mole) of bromobenzene was added at such a rate as to cause gentle refluxing. When the lithium had reacted, 117 grams (0.5 mole) of 2-chlorophenothiazine was added portionwise, and stirring was continued for a period of one hour. The reaction mixture was then cooled to about zero degrees centigrade in an ice-salt bath, and seventy grams (0.76 mole) of epichlorohydrin was added dropwise over a period of two hours. The reaction mixture was allowed to stand for 72 hours, whereupon it was washed with water, dried with anhydrous sodium sulfate, and the solvent was removed by distillation under reduced pressure. The product was a tan viscous oil.

EXAMPLE 2

*10-(3-dimethylamino-2-hydroxypropyl)-2-chlorophenothiazine*

Forty grams of the product of Example 1 was reacted with thirty grams of dimethylamine in 100 milliliters of methanol by heating in a bomb at 120 degrees centigrade for twelve hours. The excess dimethylamine and methanol were removed by distillation under reduced pressure, and the residue was dissolved in dilute hydrochloric acid prepared by mixing fifty milliliters of concentrated hydrochloric acid and 500 milliliters of water. Non-basic impurities were removed by washing the acid solution with benzene, and the washed acid solution was made basic with aqueous twenty percent sodium hydroxide solution. The precipitated oil was extracted with ether, the ethereal extract was dried with anhydrous sodium sulfate, and the ether was removed by distillation. The residue, an oil, was distilled under reduced pressure. There was thus obtained ten grams of 10-(3-dimethylamino-2-hydroxypropyl)-2-chlorophenothiazine (boiling point 185 to 190 degrees centigrade at 0.05 millimeter pressure) as an oil which upon cooling became a tan, glassy solid.

EXAMPLE 3

*10-(3-dimethylamino-2-hydroxypropyl)-2-chlorophenothiazine hydrochloride*

The free base, prepared as in the foregoing example, was dissolved in dry ether, cooled in an ice bath and stirred, whereupon a slight excess of ethereal hydrogen chloride was added dropwise. The product, a white solid, was recrystallized from ethyl acetate-methanol mixture. There was thus obtained ten grams of 10-(3-dimethylamino-2-hydroxypropyl)-2-chlorophenothiazine hydrochloride, m.p. 173 to 175 degrees centigrade.

*Analysis.*—Calcd. for $C_{17}H_{20}Cl_2N_2OS$: C, 54.98; H, 5.43; N, 7.55; Cl, 19.10. Found: C, 54.64; H, 5.73; N, 7.27; Cl, 18.92.

The compound of this example, administered intraperitoneally to mice, gave a 674 percent time increase in the standard hexobarbital sleeping test in a dosage of forty mg./kg. (twenty percent of the $LD_{50}$). At half this dosage the time increase was 374 percent.

EXAMPLE 4

*10-[3-(2,2-dimethyl-1-pyrrolidyl)-2-hydroxypropyl]-2-chlorophenothiazine*

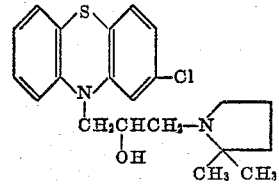

Forty grams of the product of Example 1 was reacted with sixy grams (0.6 mole) of 2,2-dimethylpyrrolidine in a bomb at 120 degrees centigrade for twelve hours, and the reaction mixture was worked up as described for the dimethylamino analogue in Example 2. The product, 10 - [3-(2,2-dimethyl-1-pyrrolidyl)-2-hydroxypropyl] - 2-chlorophenothiazine, was a reddish-tan, glass-like solid, obtained in a yield of twelve grams. It had a boiling point of 220 to 225 degrees centigrade at 0.07 millimeters pressure.

EXAMPLE 5

*10-[3-(2,2-dimethyl-1-pyrrolidyl)-2-hydroxypropyl]-2-chlorophenothiazine hydrochloride*

The free base of Example 4 was dissolved in dry ether and converted to the hydrochloride following the procedure of Example 3. The product, 10-[3-(2,2-dimethyl-1-pyrrolidyl) - 2 - hydroxypropyl] - 2 - chlorophenothiazine hydrochloride, was obtained in a yield of eleven grams of crystals which had a melting point of 186 to 188 degrees centigrade.

*Analysis.*—Calcd. for $C_{21}H_{26}Cl_2N_2OS$: C, 59.29; H, 6.16; N, 6.59; Cl, 16.67. Found: C, 59.07; H, 6.18; N, 6.45; Cl, 16.46.

The compound of this example, administered intraperitoneally to mice, gave a 893 percent time increase in the standard hexobarbital sleeping test in a dosage of sixty mg./kg. (twenty percent of the $LD_{50}$). At half this dosage the time increase was 525 percent, and at one-fourth the dosage the time increase was 243 percent.

In accordance with the procedure of Example 1, reaction of 2-trifluoromethylphenothiazine with epichlorohydrin, or 2-ethoxyphenothiazine with epichlorohydrin, or 4-chlorophenothiazine with epichloroydrin, and reaction of the respective condensation products, in order, with diethylamine, pyrrolidine, and N-methylisopropylamine in accordance with the procedure of Examples 2 and 4, above, is productive of 10-(3-diethylamino-2-hydroxypropyl) - 2 - trifluoromethylphenothiazine, 10 - [3-(1 - pyrrolidyl) - 2 - hydroxypropyl] - 2 - trifluoromethylphenothiazine, 10 - [3 - (N - methylisopropylamino)- 2 - hydroxypropyl] - 2 - trifluoromethylphenothiazine, 10-(3 - dimethylamino - 2 - hydroxypropyl) - 2 - ethoxy phenothiazine, 10 - [3 - (1 - pyrrolidyl) - 2 - hydroxypropyl] - 2 - ethoxyphenothiazine, 10 - [3 - (N - methylisopropylamino) - 2 - hydroxypropyl] - 2 - ethoxyphenothiazine, 10 - (3 - diethylamino - 2 - hydroxypropyl) - 4-chlorophenothiazine, 10 - [3 - (1 - pyrrolidyl) - 2 - hydroxypropyl] - 4 - chlorophenothiazine, and 10 - [3 - (N-methylisopropylamino) - 2 - hydroxypropyl] - 4 - chlorophenothiazine, respectively. The corresponding hydrochloride, hydrobromide, hydriodide, sulfate, citrate, acetate, succinate, benzoate, salicylate, lactate, nitrate, glycolate, tartrate, ascorbate or phosphate salts can be produced following the procedure of Examples 3 and 5, above, employing the requisite acid in the dropwise addition step thereof.

Reaction of the foregoing free bases, i.e., 10-(3-dimethylamino - 2 - hydroxypropyl) - 2 - chlorophenothiazine, 10 - [3 - (2,2 - dimethyl - 1 - pyrrolidyl) - 2 - hydroxypropyl] - 2 - chlorophenothiazine, 10 - (3 - diethylamino - 2 - hydroxypropyl) - 2 - trifluoromethylphenothiazine, 10 - [3 - (1 - pyrrolidyl) - 2 - hydroxypropyl]-2 - trifluoromethylphenothiazine, 10 - [3 - (N - methylisopropylamino) - 2 - hydroxypropyl] - 2 - trifluoromethylphenothiazine, 10 - (3 - diethylamino - 2 - hydroxypropyl) - 2 - ethoxyphenothiazine, 10 - [3 - (1 - pyrrolidyl)-2 - hydroxypropyl] - 2 - ethoxyphenothiazine, 10 - [3-(N - methylisopropylamino) - 2 - hydroxypropyl] - 2-ethoxyphenothiazine, 10 - (3 - diethylamino - 2 - hydroxypropyl) - 4 - chlorophenothiazine, 10 - [3 - (1 - pyrrolidyl) - 2 - hydroxypropyl] - 4 - chlorophenothiazine, and 10 - [3 - (N - methylisopropylamino) - 2 - hydroxypropyl]-4-chlorophenothiazine, advantageously in solution in acetone or methyl ethyl ketone with methyl bromide is productive of 10-(3-dimethylamino-2-hydroxypropyl)-2-chlorophenothiazine methobromide, 10-[3-(2,2-dimethyl-1 - pyrrolidyl) - 2 - hydroxypropyl] - 2 - chlorophenothiazine methobromide, 10-(3-diethylamino-2-hydroxypropyl)-2-trifluoromethylphenothiazine methobromide, 10-[3 - (1 - pyrrolidyl) - 2 - hydroxypropyl] - 2 - trifluoromethylphenothiazine methobromide, 10-[3-(N-methylisopropylamino) - 2 - hydroxypropyl] - 2 - trifluoromethylphenothiazine methobromide, 10-(3-diethylamino-2-hydroxypropyl)-2-ethoxyphenothiazine methobromide, 10-[3 - (1 - pyrrolidyl) - 2 - hydroxypropyl] - 2 - ethoxyphenothiazine methobromide, 10-[3-(N-methylisopropylamino) - 2 - hydroxypropyl] - 2 - ethoxyphenothiazine methobromide, 10 - (3 - diethylamino - 2 - hydroxypropyl)-4-chlorophenothiazine methobromide, 10-[3-(1-pyrrolidyl)-2-hydroxypropyl]-4-chlorophenothiazine methobromide, and 10 - [3 - (N - methylisopropylamino) - 2-hydroxypropyl]-4-chlorophenothiazine methobromide, respectively. By substituting methyl iodide, ethyl bromide, ethyl chloride, benzyl chloride or ethyl paratoluenesulfonate, the corresponding methiodide, ethobromide, ethochloride, benzyl chloride, and ethyl para-toluenesulfonate can be obtained.

The compounds of Examples 3 and 5 were evaluated as analgesics by the D'Amour-Smith method as modified by Bass and Vander Brook, [see, Journ. Am. Pharm. Assoc., Scientific Edition, vol. 41, No. 10, pages 569–570 (1952)]. Both exhibited moderate to mild, but definite activity, whereas 10-(3-dimethylamino-2-hydroxypropyl)-phenothiazine hydrochloride in comparatively larger doses exhibited at best only a trace of activity.

Substitution of morpholine for the dimethylamine in the procedure of Example 2 is productive of 10-[3-(4-morpholinyl) - 2 - hydroxypropyl] - 2 - chlorophenothiazine, which can be converted into the hydrochloride by the procedure of Example 3.

By dissolving 10-(3-dimethylamino-2-hydroxypropyl)-2-chlorophenothiazine hydrochloride produced in Example 3 in ethanol, adding an equimolar amount of thirty percent hydrogen peroxide, allowing the reaction mixture to stand at room temperature for 72 hours, adding an aqueous suspension of platinum-on-charcoal, and stirring the reaction mixture at room temperature until evolution of bubbles ceases, filtering and removing the solvent under reduced pressure, 10-(3-dimethylamino-2-hydroxypropyl)-2-chlorophenothiazine sulfoxide hydrochloride can be produced.

The free base can be obtained by reacting the hydrochloride with alkali such as sodium hydroxide and extract the free base with ether. The free base can then be converted to other salts such as the hydrobromide, the hydriodide, the sulfate, the citrate, the acetate, the succinate, the benzoate, the salicylate, the lactate, the nitrate, the phosphate, the glycolate, the tartrate and the ascorbate by neutralization with the appropriate acid.

Reaction of the sulfoxide free base, advantageously in solution in methyl ethyl ketone, with methyl bromide is productive of 10-(3-dimethylamino-2-hydroxypropyl)-2-chlorophenothiazine sulfoxide methobromide. By substituting methyl iodide, ethyl bromide, ethyl chloride, benzyl chloride or ethyl para-toluenesulfonate, the corresponding methiodide, ethobromide, ethochloride, benzyl chloride, and ethyl para-toluenesulfonate can be obtained.

By dissolving 10-(3-dimethylamino-2-hydroxypropyl)-2-chlorophenothiazine free base produced in Example 2 in ethanol, adding approximately three molar equivalents of thirty percent hyrogen peroxide, allowing the reaction mixture to stand at room temperature for 48 hours, adding an aqueous suspension of platinum-on charcoal, and stirring the reaction mixture at room temperature until evolution of bubbles ceases, filtering, and removing the solvent under reduced pressure, 10-(3-dimethylamino-2-hydroxypropyl)-2-chlorophenothiazine N,5-dioxide can be produced.

The hydrochloride, hydrobromide, hydriodide, sulfate, citrate, acetate, succinate, benzoate, salicylate, lactate, nitrate, phosphate, glycolate, tartrate and ascorbate of the N,5-dioxide can be produced by neutralization of the free base with the appropriate acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the following structural formula:

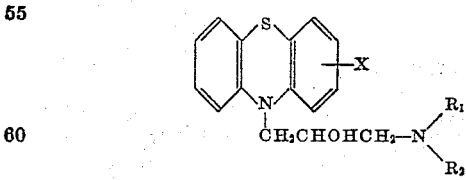

wherein X is a nuclear substituent selected from the group consisting of halogen, lower-alkoxy, and trihalomethyl, $R_1$ and $R_2$ taken individually represent lower-alkyl radicals containing from one to eight carbon atoms, inclusive, and $R_1$ and $R_2$ taken together with >N— represent a radical selected from the class consisting of pyrrolidyl, piperidyl, morpholinyl, and methyl-substituted pyrrolidyl, piperidyl, and morpholinyl radicals.

2. 10 - (3 - dimethylamino - 2 - hydroxypropyl) - 2-chlorophenothiazine.

3. 10 - (3 - dimethylamino - 2 - hydroxypropyl) - 2-chlorophenothiazine hydrochloride.

4. 10-[3-(2,2-dimethyl-1-pyrrolidyl)-2-hydroxypropyl]-2-chlorophenothiazine.

5. 10-[3-(2,2-dimethyl-1-pyrrolidyl)-2-hydroxypropyl]-2-chlorophenothiazine hydrochloride.

References Cited in the file of this patent

UNITED STATES PATENTS

| | | |
|---|---|---|
| 2,534,237 | Cusic | Dec. 19, 1950 |
| 2,595,215 | Charpentier | May 6, 1952 |
| 2,645,640 | Charpentier | July 14, 1953 |
| 2,820,031 | Horclois | Jan. 14, 1958 |

OTHER REFERENCES

Whitemore: Organic Chemistry, 2nd ed. (1951), p. 122 (D. Van Nostrand and Co., N.Y.).

Wagner-Zook: Synthetic Organic Chemistry, pp. 149–152, John Wiley and Sons, New York (1953).